June 24, 1930.　　T. E. BUTTERS　　1,766,741
RECORDING SPEED INDICATOR
Filed Nov. 11, 1924　　2 Sheets-Sheet 1
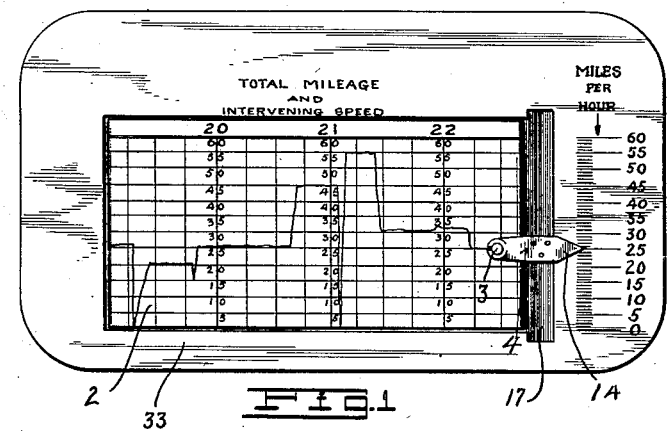
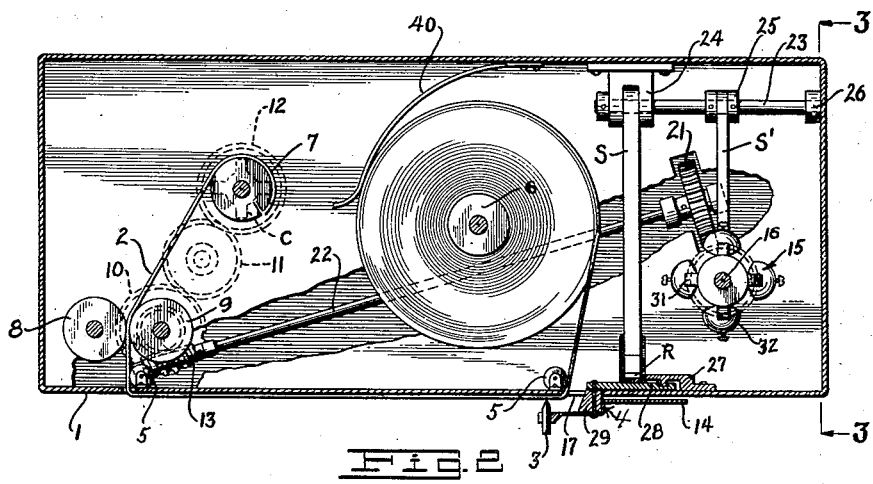
INVENTOR.
THOMAS E. BUTTERS
BY
ATTORNEY.

June 24, 1930.   T. E. BUTTERS   1,766,741
RECORDING SPEED INDICATOR
Filed Nov. 11, 1924   2 Sheets-Sheet 2
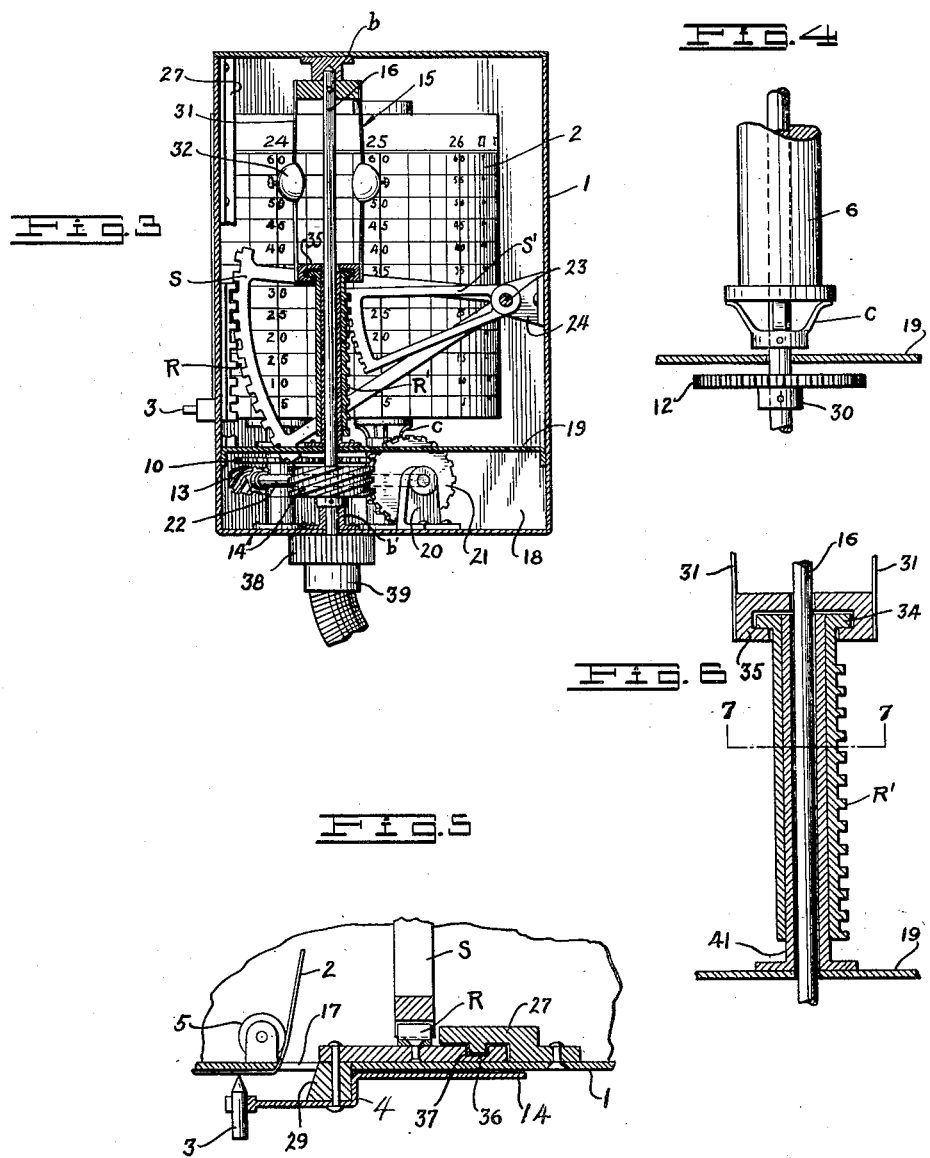
INVENTOR.
THOMAS E. BUTTERS
BY 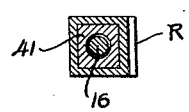
ATTORNEY.

Patented June 24, 1930

1,766,741

UNITED STATES PATENT OFFICE

THOMAS E. BUTTERS, OF LA CRESCENTA, CALIFORNIA

RECORDING SPEED INDICATOR

Application filed November 11, 1924. Serial No. 749,150.

My invention relates to a speed indicating and recording mechanism in which it is possible to indicate at all times the speed of a moving element, for example that of a moving vehicle or any moving part thereof, at all times and simultaneously make an accurate record of the speed attained by such element, vehicle, or any part thereof.

It is an object of my invention to provide an improved mechanism for simultaneously indicating and permanently recording the speed of any moving element, and to simplify and construct a mechanism of this character which is compact in form so that it will require as little space as possible.

Further objects and advantages of my device will become more apparent as the description thereof proceeds.

Reference is had to the accompanying drawings in which similar reference characters denote similar parts. In the drawings, Fig. 1 is an elevational view of my device showing the means for indicating the speed of a moving element and simultaneous therewith the means for making a permanent record of said speed, Fig. 2 is an enlarged horizontal sectional view of Fig. 1 showing the mechanism by which the indicating and recording means shown in Fig. 1 is adapted to be operated at a speed relative to the moving element with which it is associated, Fig. 3 is a vertical cross sectional view of Fig. 2 on the line 3—3, Fig. 4 is a fragmentary detail view showing the clutch by means of which one of the rollers may be steadied, Fig. 5 is a similar view showing the manner in which the recording and indicating means is mounted and also how it is operated, Fig. 6 is an enlarged detail longitudinal view in section showing the rack and the manner in which it is reciprocated when the speed responsive device or governor is being rotated, and Fig. 7 is a cross sectional view on the line 7—7, Fig. 6.

Describing my invention more in detail the numeral 1 indicates a housing or casing, preferably though not necessarily rectangular in cross section, which housing or casing is provided with a pair of slots through which the tape 2 upon which is adapted to be recorded the speed of a moving element 39 is associated with the casing 1 by means of a suitable mounting 38, an indicating or recording means 4 being adapted to be reciprocated in the slot 17, said indicating means being provided with a pointer 14 which is adapted to indicate the speed of said moving element on the scale shown in Fig. 1, the other end of said indicating means being equipped with a pencil or pen 3, which, when the indicating means 4 is reciprocated in the slot 17, is adapted to make a permanent record on the tape or movable means 2.

It is also obvious that if desired my improved device may be provided with a suitable locking means or seal to prevent the device from being tampered with.

Suitably mounted within the housing or casing 1 is a pair of rollers 6 and 7, constructed of any suitable material and of any configuration found desirable. In the present instance the tape or movable means 2 is wound upon the roller 6, which is the unwinding roller, the roller 7 being the winding roller, a spring 40 being used to steady the movement of said tape and at the same time hold it in proper position. It is, of course, understood that said spring is immaterial and may be omitted if desired.

Mounted on the front plate 33 is a pair of rollers 5, forming an anti-friction means for facilitating the movement of the tape 2, said rollers being mounted in any preferred manner. It will be understood also that said rollers are not necessary, and may be omitted if desired.

The tape 2 is passed between two rollers 8 and 9, one of which, in the present instance, is adapted to be operated at a speed relative to the speed of the moving element 39 through a mechanism presently to be described. The rollers 8 and 9 serve to guide and steady the movement of the tape 2. To provide an additional means for steadying the movement of said tape and at the same time prevent it from piling up or being fed at too rapid a rate a clutch c mounted on the shaft of the roller 6 is provided.

The recording and indicating means 4 is bent as shown in Figs. 2 and 5 and is secured to a suitable plate or reciprocating member in any preferred manner as by means of a bolt or screw, a suitable member 29 being positioned therebetween for spacing the recording and indicating means 4 from said plate, said plate having secured thereto by any preferred means a rack R, said plate being also provided with a groove 37 in which the projection 36 of a securing member 27 suitably fastened to the casing 1 is adapted to project. It will be obvious that the rack R is reciprocated with the indicating means 4, the groove 37 and projection 36 providing a means for steadying the same when said rack and indicating means are reciprocated.

Mounted in suitable bearings b and b' secured to the casing 1 in any preferred manner is a governor or speed responsive device shaft to which is secured the governor or speed responsive device 15, which may be of any preferred type of construction. In the present instance a set of centrifugal weights or members preferably four in number, 32 are adjustably secured to governor springs 31 by means of suitable set screws or otherwise. One end of the governor 15 is equipped with a grooved collar 35 to which the springs 31 are adapted to be secured in any preferred manner. Mounted on the partition 19 of the casing 1 is a tube or sleeve 41, which sleeve is stationary and in which the governor shaft 16 is adapted to be rotated. Surrounding the tube or sleeve 41 is another tube or sleeve provided with a rack R' which has a flange 34 on one end positioned in the groove of the collar 35. Said flange and collar are shown in exaggerated form in Fig. 6, the collar 35 in practice being sprung over said flange or otherwise assembled. As shown in Fig. 7 both of said sleeves or tubes are square in cross section, though it is clear that they may take in practice any form found to be desirable. As will be clear, when the balls or weights 32 fly out by centrifugal action as the governor shaft 16 is rotated, the grooved collar 35 is reciprocated by means of the springs 31, which in turn reciprocate the rack R'.

It is desirable to operate the tape 2 by means of the governor or speed responsive device 15, by means of intermediate connections presently to be described, to provide for a movement of said tape at a speed relative to that of the moving element 39. It is of course to be distinctly understood that any speed ratio found desirable may be had. For this purpose a shaft 23, suitably mounted in bearings 24 and 26 secured to the casing 1 in any preferred manner has pivotally secured thereto a pair of sector gears S and S', suitable collars 25 being provided to position the sector gear S' in place. As shown in Figs. 2 and 3 the large sector gear S is adapted to mesh with and reciprocate the rack R which in turn reciprocates the recording and indicating means 4. The small sector gear S' is adapted to mesh with and be reciprocated by the rack R'. As will be clear, when the governor reciprocates the rack R' said rack will oscillate the sector gear S' which, being securely fastened to the shaft 23, will also oscillate the sector gear S, also securely fastened to said shaft. The sector gear S reciprocates the recording and indicating means 4 so that the pointer 14 will indicate the speed of the moving element 39 and at the same time cause a permanent record of said speed to be made on the moving tape 2.

To operate the winding and unwinding rollers 7 and 6 at a speed proportional to that of the moving element 39, the governor shaft 16 has securely fastened thereto a worm gear 14' which is adapted to mesh with a pinion 21 suitably mounted on a diagonal shaft 22 by means of suitable collars or otherwise, which shaft is journalled in a standard 20. On the other end of the diagonal shaft 22 is another worm gear 13 adapted to mesh with a pinion 10 securely fastened to one of the rollers 8 or 9, in the present instance the roller 9, which roller is adapted to be rotated therewith. Meshing with the gear 10 is an idler gear 11 which in turn meshes with the gear 12 securely fastened to the shaft of the winding roller 6, which gear is secured in place by means of a collar 30 mounted on said shaft. It will thus be seen that the winding roller 7 is operated at the same speed as the rollers 8 and 9.

In operation the moving element 39, which may be a speedometer shaft attached to any moving part of a motor vehicle and which part travels at the same speed as said vehicle, rapidly turns the governor shaft 16, said shaft 16 causes the weights 32 to fly out by centrifugal action, which causes the rack R' to be reciprocated. The sector gear S' operated by said rack R' operates the shaft 33 which in turn operates the sector gear S to operate the rack R which in turn reciprocates the indicating means 14 to indicate the speed at which the vehicle is traveling, on the scale shown in Fig. 1. At the same time the pencil or pen 3 makes an accurate record of such speed on the moving tape 2. The rotation of the shaft 16 is communicated to the diagonal shaft 22 by means of the worm gear 14' and pinion 21. The worm gear 13 operates the gear 10 which, through the idler gear 11, operates the gear 12 to wind the roller 7.

It will thus be seen that I have provided a device which is simple in operation, efficient in use, easy and inexpensive to construct, durable, thoroughly reliable, and which provides efficient means whereby, if the vehicle with which it is associated is operated beyond a certain speed, a plain indication thereof may be shown by the permanent record made on the tape 2.

While I have described my apparatus with great particularity, it will be obvious that the same may be modified throughout a wide range. I therefore do not propose to be limited to the exact details of construction shown and described but reserve the right in practice to make any and all modifications thereof that fall within the scope of the appended claims.

I claim as my invention:

1. A speed indicator comprising a casing provided in one side with a vertical slot, a slide mounted in said slot and having a rack on its rear face, a shaft mounted in the casing in spaced relation to the slide, a pair of concentric toothed segments interconnected and mounted on said shaft with the segment of larger diameter meshing with the rack of said slide, a speed responsive device mounted in the casing, and a rack bar connected to the speed responsive device and meshing with the segment of smaller diameter for moving the same and indicating at an increased ratio variations in speed by said slide with respect to the marginal portion of the vertical slot.

2. A speed indicating mechanism comprising a casing provided with a vertical slot in one side, a slide fitted in the slot for movement therein, said slide having rack teeth on its inner side, a shaft mounted transversely in the casing, a pair of concentric toothed segments mounted on the shaft and connected together for simultaneous movement, the larger segment intermeshing with the teeth of the slide, a guide mounted in the casing, a rack bar mounted in said guide and intermeshing with the segment of smaller radius, and a speed responsive device connected to the rack bar for moving the same to actuate the segments and move said slide.

3. In a device of the class described including a casing having positioned therein winding and unwinding means, a movable tape actuated by both of said means, and recording means adapted to make a record on said tape; the combination of a longitudinal shaft, a pair of sector gears of different size mounted on said shaft, a transverse shaft, a governor operable by said transverse shaft, a rack sleeve on said transverse shaft, adapted to be operated by said governor, a worm gear on said transverse shaft, a pinion in mesh with said worm gear, a diagonal shaft operable by said pinion, a worm gear on said diagonal shaft adapted to operate said winding means, the smaller of said sector gears being in mesh with said sleeve rack, and a rack on said recording means, the larger of said sector gears being in mesh with the rack on said recording means.

In testimony whereof I have signed my name to this specification.

THOMAS E. BUTTERS.